United States Patent [19]
Dzierski

[11] 3,831,263
[45] Aug. 27, 1974

[54] METHOD OF SOLDERING
[75] Inventor: Stanley F. Dzierski, Arnold, Pa.
[73] Assignee: Aluminum Company of America, Pittsburgh, Pa.
[22] Filed: Aug. 11, 1972
[21] Appl. No.: 279,826

[52] U.S. Cl.................... 29/503, 29/504, 75/178 A, 228/40
[51] Int. Cl....................... B23k 31/02, B23k 35/12
[58] Field of Search..................... 29/502, 503, 504; 75/178 R, 178 AM, 178 AT, 178 AN, 178 A; 228/40

[56] References Cited
UNITED STATES PATENTS

| 2,397,400 | 3/1946 | Barwick | 29/503 X |
|---|---|---|---|
| 2,671,958 | 3/1954 | Block | 29/503 |
| 2,824,543 | 2/1958 | Brown | 29/503 X |
| 2,937,435 | 5/1960 | Brenner | 29/504 UX |
| 3,000,342 | 9/1961 | Borosy et al. | 228/40 |
| 3,480,465 | 11/1969 | Imbayashi et al. | 75/178 R |
| 3,570,741 | 3/1971 | Corsaro | 228/40 |
| 3,703,763 | 11/1972 | Berry | 29/503 |
| 3,733,168 | 1/1956 | Hodge et al. | 29/503 X |
| 3,744,121 | 7/1973 | Nagano et al. | 29/504 X |

FOREIGN PATENTS OR APPLICATIONS

| 1,926,903 | 12/1969 | Germany | 29/503 |
|---|---|---|---|
| 646,233 | 11/1950 | Great Britain | 75/178 A |

OTHER PUBLICATIONS

Soldering Aluminium, published by Reynolds Metals Company, edited by G. W. Birdsall, written by C. P. Talbott, copyright 1959, pp. 8, 12, 13, 15, 17
Soldering Manual prepared by A. W. S. Committee on Brazing and Soldering, 1959, pp. 66–68, 73–76, 121–130.

Primary Examiner—J. Spencer Overholser
Assistant Examiner—Ronald J. Shore
Attorney, Agent, or Firm—Carl R. Lippert

[57] ABSTRACT

An improved method of soldering aluminum members employs a solder consisting essentially of zinc, aluminum, and beryllium. The method uses dip or immersion soldering techniques, especially those involving ultrasonically energized baths.

9 Claims, No Drawings

METHOD OF SOLDERING

BACKGROUND OF THE INVENTION

Components of aluminum or alloys thereof are currently joined by a number of procedures employing soldering alloys typically containing varying amounts of lead, tin, antimony, zinc and aluminum at temperatures in the general neighborhood of 800°F or less, usually less. One such soldering alloy often utilized has a zinc base and contains up to about 10 percent by weight aluminum. Chemical fluxes are often used in soldering to remove the tenacious surface oxide film on the aluminum members being joined to provide a clean metal surface which the molten solder alloy can wet and adhere to. Other means of removing the oxide film have been used typical of which are mechanical abrasion and ultrasonic energy, the latter having attained some degree of acceptance for some applications.

One useful technique in soldering involves dipping or immersing the joint components, separately or assembled in joining configuration, into a molten solder bath to coat or pre-tin the separate pieces for subsequent joining or to effect in situ soldering of an assembly. When the solder bath contains aluminum there is a considerable tendency for a gummy dross, comprising oxides and entrained solder alloy, to form on the surface of the bath and this solder-dross adheres to the immersed surfaces as a gummy coalesced mass when the surfaces are withdrawn from the bath. The result is a very uneven and sometimes excessive solder distribution. This condition has been experienced in various dip soldering applications including ultrasonic dip soldering. It has been common practice to attempt removal of the excessive solder-dross from the joint sites by energetic shaking of the assembly or separately pre-tinned components. This practice is not only cumbersome but some of the solder-dross material remains in the eventual soldered joint and can cause voids in the joint. The severity of the problem appears to increase as the aluminum content of the bath increases. Aluminum, however, is desirable in the solder alloy because it lowers the melting point of the zinc thereby permitting joining at lower temperatures. Aluminum, however, is desirable in the solder alloy because it lowers the melting point of zinc. Further, even employing substantially pure zinc does not alleviate the problem since molten zinc dissolves metal from the aluminum or aluminum alloy members during immersion and consequently the zinc based solder alloy bath becomes enriched in aluminum as soldering continues.

DESCRIPTION

It has been discovered that minor additions of beryllium to zinc based solder alloys containing up to about 10% by weight aluminum greatly improve its fluidity and wetting characteristics and further materially contribute to improved soldering characteristics by substantially alleviating the solder-dross problem discussed earlier. The invention, accordingly, contemplates a solder alloy particularly suited for dip or immersion soldering aluminum or aluminum alloy components or members, the solder alloy consisting essentially of, be weight, up to about 10 percent, typically 1 to 10 percent, aluminum, about 0.005 to about 0.1 percent beryllium, the balance essentially zinc. Preferred limits for the solder bath are 3 to 7 percent or 4 to 6 percent for aluminum from the standpoint of low melting point and 0.01 to 0.03 percent for beryllium from the standpoint of effectiveness and economy. Another preferred alloy suitable in practicing the invention includes essentially zinc with about 0.015 to about 0.025 percent beryllium.

The components or members being joined, sometimes referred to as the parent members, can be fashioned from any of the aluminum materials commonly employed in soldered structures. They may be of aluminum or an alloy thereof and a joint may comprise members of different aluminous compositions. Typical alloys include those containing at least 75 percent aluminum and one or more up to 10 percent or 12 percent zinc, magnesium, copper or silicon, up to 1 or 2 percent of elements such as iron, manganese, nickel or chromium. The aluminum members may be either cast or wrought and an aluminum member can be joined to a non-aluminum member. For instance, an aluminum member can be joined to a copper or brass member in the practice of the invention.

The practice of the invention contemplates immersion of the joint components into the solder bath either separately or assembled in joining relationship. In the former case one or more of the aluminum components is immersed into the solder bath separately to apply thereto a solder coating. Subsequently, the pre-tinned components are assembled into the desired joint configuration and reheated to liquify the solder which results in a union of the components upon solidification of the solder. Some relative movement between the components while in joint configuration and while the solder is molten aids in achieving a sound joint.

In the latter case the components are assembled into joining relationship prior to immersion, by which is meant into such configuration and proximity that molten solder can reach and wet the appropriate surfaces to form a connection or bridge therebetween when immersed which upon solidification provides the joint.

The temperature of the solder bath typically ranges from 725°F to 850°F, preferably 750° to 825°F, with the optimum temperature being dependent on the particular composition of the solder alloy since the melting range of the alloy is dependent upon composition. The bath temperature is preferably maintained at a level just above the solder melting temperature but not excessively high as to cause excessive dissolution of aluminum from the components being soldered.

Repeated immersion soldering depletes the bath of solder metal but additionally alters the composition of the remaining metal since, as indicated earlier, a zinc base solder alloy attacks aluminum and dissolves some amount thereof thereby enriching the bath with respect to aluminum. Thus the bath tends to become depleted with respect to zinc and beryllium while becoming enriched with respect to aluminum. Accordingly, the invention contemplates periodically replenishing the bath compensate for metal removed and to regulate the composition of the bath within the desired limits. Thus the invention contemplates periodically adding a solder alloy consisting essentially of a zinc base together with the above-prescribed amounts of beryllium and containing less aluminum than that desired in the bath so as to compensate for the depletion in the bath composition with respect to zinc and beryllium and the enrichment with respect to aluminum. Typically the invention contemplates periodic additions to the bath of an alloy containing 0.01 to 0.1 percent beryllium, the balance essentially zinc. Also the invention contemplates that the periodic solder alloy addition contain amounts of aluminum which are smaller than the levels desired in the melt. Thus where it is desired to maintain a bath at a 5 percent aluminum level the bath is suitably replenished by the addition thereto of an alloy containing 0.5 to 4 percent aluminum, 0.01 to 0.1 percent beryllium, the balance essentially zinc. The alloy containing aluminum will be found to melt at a lower temperature which can offer advantage in some instances. The make-up solder can be added in any convenient form such as ingot blocks or sticks, wire, or other forms.

The practice of the invention also contemplates the use of ultrasonic energy during immersion since such can alleviate the need for a chemical flux. The ultrasonic energy may be applied with any known means including ultrasonic exciting means immersed in the bath or external means which excite the bath through the walls of the bath receptacle or pot. As already mentioned, it has heretofore been a practice to ultrasonically pre-tin the individual joint components by dipping them into a molten solder bath. Upon removal from the bath they are vigorously shaken to remove as much excess solder as possible from the component surfaces. Use of the improved solder alloy with ultrasonic soldering alleviates or greatly reduces the need for this shaking and the pre-tinned components can usually be joined substantially in the condition as withdrawn from the bath. Equally significant is the fact that the improved solder in some applications facilitates fluxless soldering of preassembled joints without first separately pre-tinning because the beryllium minimizes excessive coalesced solder and dross at the joint sites thereby ensuring free flowing of the molten solder around the surfaces being joined. Also, the beryllium actually improves some of the flow characteristics of the solder alloy enabling it to better flow into joint crevices and capillaries. Ultrasonically fluxless dip soldered joints have exhibited a remarkable level of uniformity of joint thickness and absence of porosity or voids in the solder filler metal when produced by the improved method employing the improved solder.

What is claimed is:

1. A method of producing a solder joint comprising two or more members of aluminum or its alloys, the method comprising the steps:
    1. providing a bath of molten solder consisting essentially of about 0.01 to 0.1 percent beryllium, 3 to 7 percent aluminum, the balance essentially zinc;
    2. bringing said members into fixed joining relationship to provide a joint site and immersing the joint site in said bath to apply thereto quantities of said solder alloy which wet said members and form a connection therebetween;
    3. withdrawing said members and solidifying said solder at said joint site.

2. The method of claim 1 wherein ultrasonic energy is applied to said molten solder bath during said immersion.

3. The improved method according to claim 1 wherein said molten solder bath contains a controlled amount of aluminum ranging from 3 to 7 percent of the bath composition and said alloy is periodically replenished by a similar alloy consisting essentially of 0.01 to 0.1 percent beryllium and an amount of aluminum less than said controlled amount, balance essentially zinc.

4. The improved method according to claim 1 wherein said molten solder bath contains 0.01 to 0.03 percent beryllium.

5. The method according to claim 1 wherein said solder bath is maintained between 725° to 850°F.

6. The method according to claim 1 wherein said solder bath is maintained between 750° to 825°F.

7. A method of producing a solder joint comprising two or more members of aluminum or its alloys, the method comprising the steps:
    1. providing a bath of molten solder consisting essentially of about 0.01 to 0.1 percent beryllium, 3 to 7 percent aluminum, the balance essentially zinc;
    2. maintaining said bath at a temperature of between 750° and 825°F;
    3. bringing said members into fixed joining relationship to provide a joint site and immersing the joint site in said bath while said bath is ultrasonically excited to wet said members at said site with solder alloy and form a connection therebetween;
    4. withdrawing said members and solidifying said solder at said joint site.

8. In the method according to claim 7 the further improvement whereby said solder bath is periodically replenished by adding thereto an alloy consisting essentially of about 0.01 to 0.1 percent beryllium, up to 7 percent aluminum, balance essentially zinc.

9. In the method according to claim 7 the further improvement whereby said bah is periodically replenished by adding thereto a solder alloy consisting essentially of 0.01 to 0.1 percent beryllium, 0.5 to 4 percent aluminum, the balance essentially zinc, said aluminum content, however, being less than a controlled amount maintained in said solder bath thereby to control the composition and melting characteristics of said solder bath through repeated soldering operations.

* * * * *